Jan. 27, 1959   A. S. GILL, JR   2,870,648
THROTTLE ADVANCE CONTROL
Filed June 16, 1954   4 Sheets-Sheet 1

INVENTOR.
ANDREW S. GILL, JR.
BY
ATTORNEYS

Jan. 27, 1959  A. S. GILL, JR  2,870,648
THROTTLE ADVANCE CONTROL
Filed June 16, 1954  4 Sheets-Sheet 2

INVENTOR.
ANDREW S. GILL, JR.
BY
ATTORNEYS

Jan. 27, 1959  A. S. GILL, JR  2,870,648
THROTTLE ADVANCE CONTROL
Filed June 16, 1954  4 Sheets-Sheet 3

INVENTOR.
ANDREW S. GILL, JR
BY
ATTORNEYS

Jan. 27, 1959     A. S. GILL, JR     2,870,648
THROTTLE ADVANCE CONTROL

Filed June 16, 1954     4 Sheets-Sheet 4

INVENTOR.
ANDREW S. GILL, JR
BY
ATTORNEYS

United States Patent Office 2,870,648
Patented Jan. 27, 1959

2,870,648

THROTTLE ADVANCE CONTROL

Andrew S. Gill, Jr., South Euclid, Ohio, assignor to Eaton Manufacturing Company, Cleveland, Ohio, a corporation of Ohio Application June 16, 1954, Serial No. 437,245

13 Claims. (Cl. 74—472)

The present invention relates to shift advance systems and more particularly to automatic shift advance governor systems of the load speed responsive nature.

Broadly the invention comprehends the provision of an automatic shift advance system comprising a power source, a shiftable transmission, a load and a governor responsive to the load speed and to a predetermined engine characteristic to control the shift points of the transmission.

An object of the present invention is the provision of a shift advance governor that is simple of design having a minimum of parts yet effective to provide a control of the shift points of a transmission.

A further object of the present invention is a provision of a shift advance system providing for optimum gearing of the transmission under varying load conditions.

A further object of the present invention is a provision of a shift advance system providing for shift control of transmissions for automotive vehicles and the like.

Other objects and advantages of the invention will appear from the following description taken in connection with the accompanying drawings in which like components in the several figures bear the same reference numerals and in which.

Figure 7:
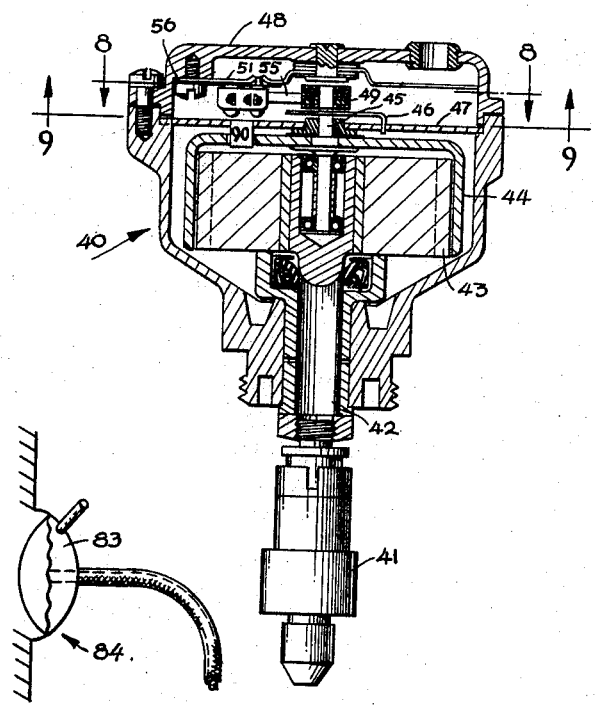
Fig. 7 is a sectional view of an eddy current or drag cup governor.
Figure 8:
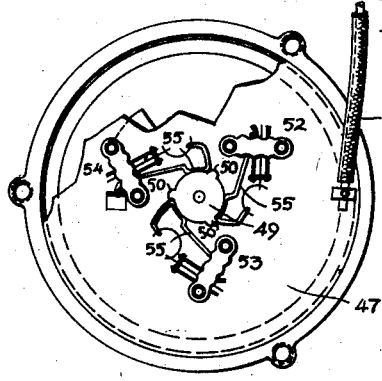
Figure 9:
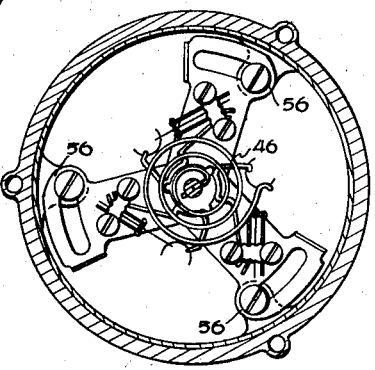
Figure 11:
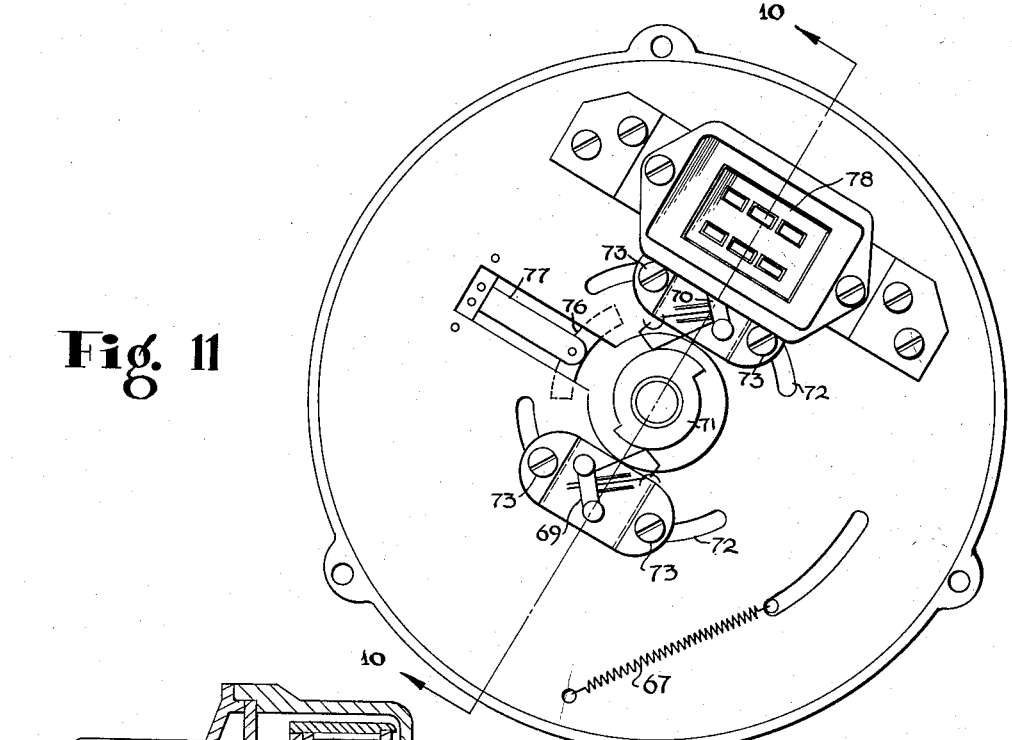
Figure 10:
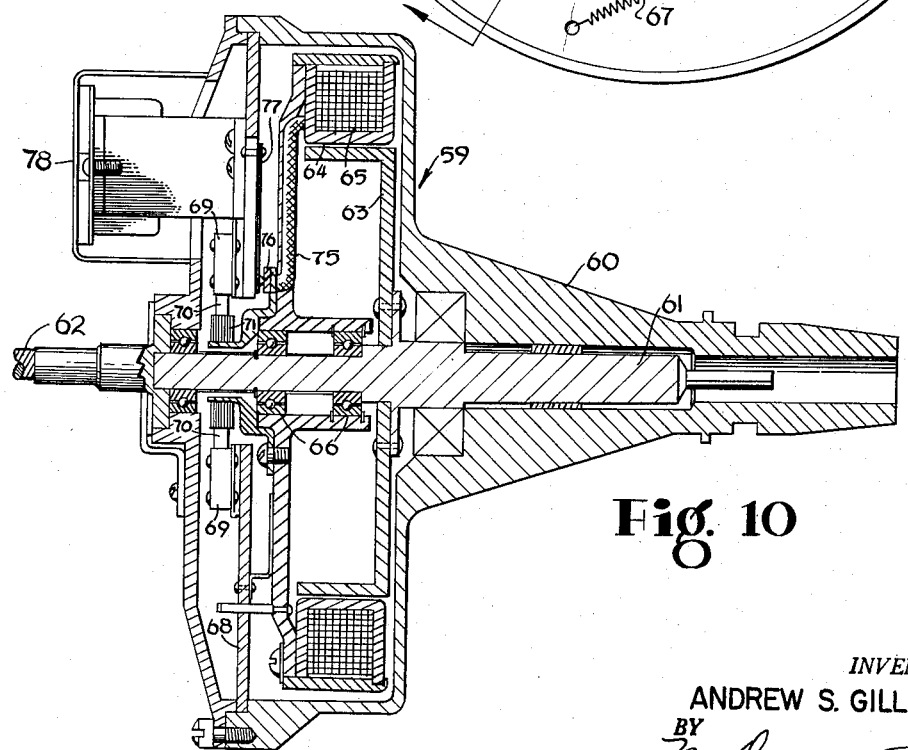

Figs. 8 and 9 are sectional views of a permanent magnet eddy current governor shown in Fig. 7 and taken along sections 8—8 and 9—9 respectively;

Fig. 10 is a sectional view of an eddy current governor of the electromagnetic type; and Fig. 11 is an end sectional view of the governor shown in Fig. 10.

The present shift advance governor system was devised for the purpose of providing a simple, rather economical system effective to supply desirable conditions of operation such as are required in automotive vehicles and other powered mechanisms of the like sort, that is, an optimum gearing between the driving and driven members providing a high torque at high load and low output speeds and a decreased torque at lower load or high output speeds.

These results are achieved through the provision of a shift advance governor operable with a system including an engine or driving means, a shiftable transmission, and a load or driven member such as the driven wheels of an automobile. The governor is responsive to predetermined conditions of operation including road speed, engine speed and throttle position or manifold vacuum. In one instance, a governor of the mechanical flyweight type controls the actuation of a plurality of switches closable in sequence to govern flow of current through a shifting solenoid of the transmission. Closure of the switches depends on load speed which may be the road speed of a vehicle. The closure of one switch is followed by the closure of the next when sufficient speed is attained. Thus an arrangement is provided whereby the gearing ratio is maintained until a more efficient ratio may be had and is provided. In another instance a use is made of engine vacuum as a means of dictating when a shift is required. In this case, a plurality of switch contacts are closable in sequence depending on the magnitude of engine vacuum and a pair of switches being respectively in series with each of the vacuum operated switches are actuated at fixed trip points. In still another instance and according to a preferred embodiment of the present invention, the shift points are determined by the engine throttle position which varies the amount of current through an eddy current clutch by means of a caterpillar-typet variable resistor, for example. The circuits of the transmission control coils are closed through switches that are actuated by the driven member of an electromagnetic eddy current clutch. The excitation of the clutch depends upon the engine throttle position. An increased throttle position at low speed decreases current in the governor clutch coil to decrease clutch coupling and thereby delay actuation of the shift solenoid circuit switch. A decreased throttle position or an increased engine speed advances the shift points in this instance. In an alternative arrangement employing an eddy current governor, a mechanical system may be used. A linkage connected to the throttle linkage rotates a clutch member on which the transmission coil circuit switches are mounted so that more motion of the output member is required to actuate a given switch.

Figure 1:
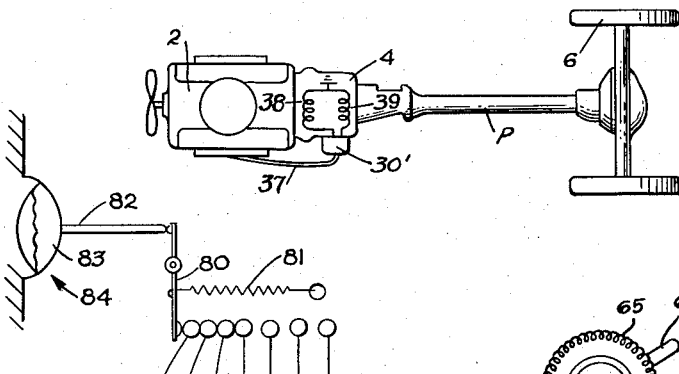
Fig. 1 is a block diagram showing the general arrangement of components involved.

Referring now to the drawings for a more detailed description of the invention wherein Fig. 1 shows a system comprising an engine mechanically coupled to a shiftable transmission which in turn is coupled to a load 6 shown in the form of vehicle ground contact wheels. The shift advance governor 30' is mechanically coupled to the transmission output shaft and is operatively connected to the engine by a conduit 37 connecting the engine intake manifold with the shift advance governor and is electrically coupled to the shift coils of the transmission. In Fig. 1 the shift advance governor is controlled by an engine characteristic in addition to the load speed of the system. The engine characteristic may be intake manifold vacuum, throttle position or any other characteristic that varies as desired engine speed differs from actual engine speed. As an example, under heavy load the engine throttle opening is increased to increase engine speed and load speed and consequently manifold vacuum is decreased. In the one instance increased throttle diminishes governor clutch coil excitation and in the other instance decreased vacuum retains shift coil switches open.

Figure 3:
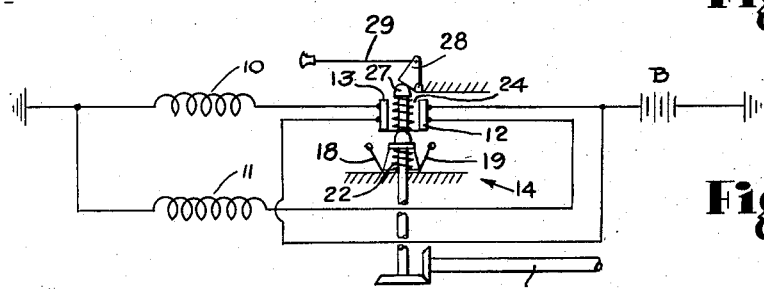
Fig. 3 is a schematic representation of a mechanical shift advance governor for controlling excitation of a gear shift solenoid.

Fig. 3 shows the circuit arrangement of the mechanical shift advance arrangement wherein 10 and 11 represent respective solenoid shift coils as are conventional in automatically shiftable transmissions. In series with the coils are switches 12 and 13, respectively, actuable by a flyweight governor 14, shown more particularly in Fig. 5. Governor 14 is coupled to the transmission output shaft $p$ through a coupling member shown generally at 15 in Fig. 5 and fixedly secured to one end of a rotatable shaft 16.

Figures 5, 6:
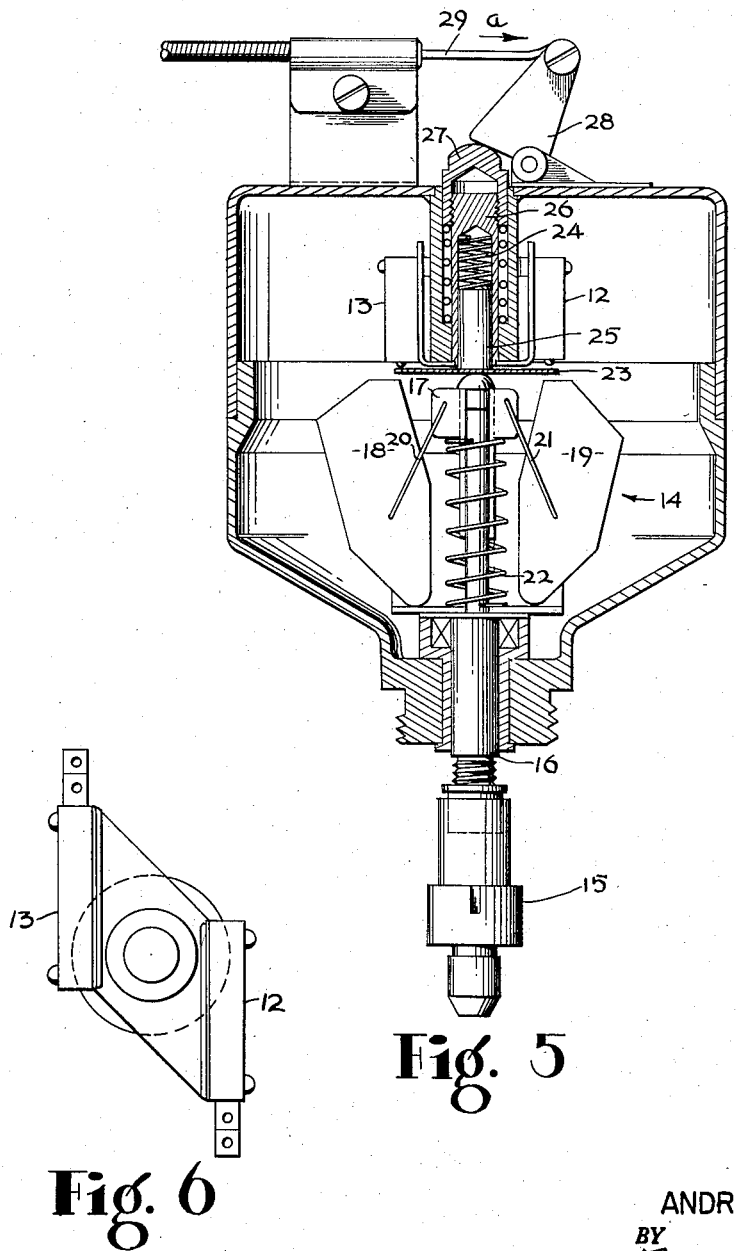
Fig. 5 is a sectional view of a flyweight governor forming a part of the present invention.
Fig. 6 is a switch forming a part of the governor in Fig. 5.

At the other end of shaft 16 is a plunger member 17 being slidably secured to shaft 16 and rotatably carrying a pair of flyweights 18 and 19 by means of a pair of arm supports 20 and 21. Centrifugal force due to rotation of the flyweights 18 and 19 causes plunger 17 to move downwardly overcoming the resistance of flyweight spring 22. Switch plate 23 is held against the upper end of plunger 17 by virtue of the force of advance spring 24 against the end of cylindrical member 25 rigidly secured to switch plate 23 and axial movement of switch plate 23 causes sequential actuation of switches 12 and 13 by reason of the fact that these switches are adjustably mounted as to be in varying axial spaced relationship from switch plate 23, as shown in Fig. 5 of the drawings. It is noted that the force of advance spring 24 is in opposition to that of flyweight spring 22 and the effect of spring 24 is to unseat switch plate 23 and to actuate switches 12 and 13. The compression of advance spring 24 is varied by the axial position of a plunger member 26 having a cap 27 threadedly attached to the upper end thereof. In pivotal engagement with cap 27 is a cam 28 having a Bowden wire 29 throttle linkage attached to the other end. Increase in throttle, that is movement in the direction of arrow $a$, rotates cam 28 so as to relieve the force against the top of cap member 27 and results in extension of advance spring 24 so as to relieve the force tending to move switch plate 23 downwardly. Consequently, the actuation of switches 12 and 13 is delayed since a greater force due to flyweight rotation is now required to relieve the force of spring 22 against the bottom side of plate 23.

As shown schematically in Fig. 3, the contacts of switch 13 are spaced nearer to the fixed contacts thereof than the movable contacts of switch 12 are spaced from the fixed contacts of switch 12. As a result, switches 12 and 13 are closed in sequence as the output speed of the transmission increases but is, of course, varied in actuation by the throttle position as pointed out above. In Fig. 3 each circuit of the coil and switch arrangement with the other like circuit forms a parallel circuit which is in series with a source of direct voltage B. The circuit is completed through any suitable connection as, for example, the ground connection which may be an automobile frame. From the foregoing it may be seen that an optimum gearing ratio is provided in the transmission as the load conditions may demand. Under heavy load and increased throttle, shift points of the transmission are advanced to a point where engine speed has increased to a value more desirable for carrying the increased load.

Figure 4:
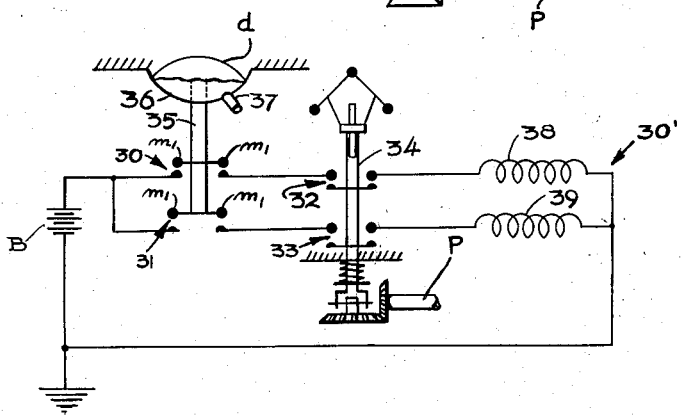
Fig. 4 is a schematic representation of a shift advance governor system for controlling excitation of a gear shift solenoid and being responsive to manifold vacuum.

The control system 30' shown in Fig. 4 differs from that in Fig. 3 in that a second pair of sequentially operated switches 30 and 31 are provided each in series respectively with flyweight governor actuated switches 32 and 33 adapted to be actuated by a governor 34. The switches 32 and 33 actuated by governor 34 are similar to switches 12 and 13 actuated by governor 14 and bear like spacing relative to one another. The second pair of switches have movable contacts $m_1$ fixedly connected to movable arm 35 which arm in turn is attached to the diaphragm $d$ of vacuum chamber 36. Chamber 36 is in communication with the engine intake manifold by some suitable means as, for example, tubing connected to spout 37. In series with each set of switches are shift coils 38 and 39 to complete each branch of the parallel arrangement. A source of direct voltage B provides energization of coils 38 or 39 whenever the circuit thereof is completed through the switches, the coil and the ground connection. In an automotive system on a start from standstill, manifold vacuum decreases or pressure increases to cause the lower section of chamber 36 to increase in absolute pressure by virtue of the mentioned communication between the engine manifold and chamber 36 through spout 37. Consequently the diaphragm of chamber 36 rises as viewed in Fig. 4 to raise arm 35 and therefore also contacts $m_1$ away from the fixed contacts of vacuum switches 30 and 31. Thus, when the flyweight governor operated switches 32 and 33 close in response to load speed, no change occurs in the transmission gearing until the engine vacuum increases sufficiently to close vacuum operated switch 30 set for a lower vacuum than switch 31. As soon as switch 30 closes, the electrical circuit through shift coil 38 and the gearing in the system transmission is shifted or changed for optimum operation. When sufficient manifold vacuum is attained in the second gear ratio, switch 31 is closed to complete the circuit through coil 39. This causes a second shift to a third gear ratio in the transmission which may be the final or high gear.

A further embodiment of the shift advance governor forming a part of the present invention is an eddy current or drag cup governor 40 shown in Figs. 7, 8 and 9 and reference to which is now made. The governor 40 is responsive to transmission output speed in the same manner as the modifications disclosed in Figures 3 and 4 and some engine characteristic (as disclosed in the modifications shown in Figures 2 and 3) to govern the actuation points of the coil switches. A suitable coupling member 41 is provided for driving engagement at one end thereof with the transmission output as shown in Fig. 1. At the other end, member 41 is coupled to shaft 42 which extends axially toward and is rigidly connected to a rotatable permanent magnet 43. A scalloped circumferential surface of permanent magnet 43 is closely spaced inwardly of drag cup member 44 and is in relatively rotatable relationship thereto. Drag cup 44 is mounted for rotary movement with a shaft 45, complete rotation thereof being resisted by spiral spring 46 which is engaged at its outer end with plate 47 and at the inner end to shaft 45. Plate 47 is rotatably adjustably mounted on housing 48 and has a lip 90 punched therefrom engageable with cup 44 to provide a stop to limit the rotary movement of cup 44.

Rotatable with shaft 45 and extending axially therefrom is a cam member 49 having 3 cam lobes 50 equally spaced about the periphery thereof. A plate 51 spaced axially from plate 47 is also fixedly secured to the clutch housing 48 by any suitable means and it supports 3 switches 52, 53, and 54 at spaced points thereon. Each of the switches has an arm 55 extending from the switch and has a portion thereof in contacting relation with the cam 49 and is actuable thereby to open or close the contacts of the switch as the case may be. Individual rotary adjustment for the switches is provided at 56 so as to render them actuable by any predetermined oscillatory movement of plate 47. A Bowden wire 57, adapted to be coupled to the engine and responsive to a characteristic thereof, such as, manifold vacuum which is communicable with a vacuum chamber 83 of a diaphragm assembly 84, is connected to plate 47 to rotate the same to vary the load of spring 46 resisting rotation of cup 44 and thereby to provide a shift advance.

Figure 2:
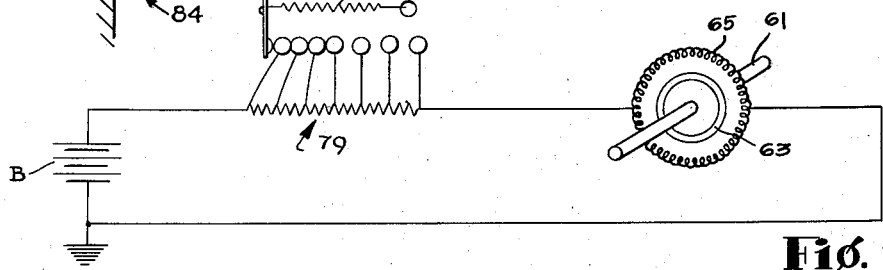
Fig. 2 is a schematic representation of an electrical circuit for controlling clutch excitation in response to throttle position.

A preferred form of invention is shown in Figs. 2, 10, and 11, reference to which is now made. Figs. 10 and 11 show different views of an electromagnetic eddy current clutch governor 59 similar to the permanent magnet eddy current clutch governor 40 already described but differing in that a magnetic field is provided by an excited coil rather than by a permanent magnet. Rotatably mounted in a housing 60 is a shaft 61, the end of which is socketed so as to engage with the male take-off speedometer drive from the transmission. Shaft 61 extends axially through the clutch and is fixedly secured to a speedometer cable 62 at the other end thereof. Rigidly secured to shaft 61 and rotatable therewith is a clutch input member 63. Spaced closely adjacent to input member 63 is output member 64 having an annular electromagnetic coil 65 wound thereon and being journalled in an appropriate manner as by bearings 66. Coil 65 is energized through appropriate connections including shielded wire 75, arcuate slip ring 76, arm 77, and an appropriate connection from arm 77 to one of the female sockets in outlet 78, with the return connection to coil 65 being grounded. Rotary motion of output member 64 is resisted by spring 67, one end of which is secured to member 64 and the other end of which is fixedly secured to plate 68 by any appropriate means. Plate 68 provides the mounting support for switches 69 and 70 and is rigidly attached to housing 60. Fixedly secured to the shaft support for output member 64 is a Bakelite cam member 71 having a spirally curved surface with a pair of steps as shown more clearly in Fig. 11. Switches 69 are similar in construction to switches 52, 53, and 54 in Figs. 8 and 9 and each has an arm 70 extending into engagement with cam member 71 and are actuable by the rotary motion of the cam. Switches 69 are respectively adjustable in angular position on plate 68 by means of arcuate slots 72 and tightening screws 73 to control the points of shift of the gear ratios in the transmission. Each of switches 69 is shown as being of the single pole double throw type but in one instance only one throw position is employed, the other throw position being merely an "off" position for that switch. Each of the active contacts of these switches is conductively connected to one of the female sockets of outlet 78 not connected to that socket energizing coil 65.

For a clear understanding of the operation of the electromagnetic governor, a consideration of Fig. 2 along with Figs. 10 and 11 is helpful. In Fig. 2 is shown schematically electromagnetic coil 65 in series with a caterpillar type of variable resistance device 79 and direct voltage source B. Caterpillar 79 is actuated by the pivotal movement of an arm 80. Arm 80 is urged for counter-clockwise movement by the spring 81 and for clockwise movement by the linkage arm 82, which arm is responsive to an engine characteristic giving an indication of the difference between actual load speed and desired load speed as, for example, intake manifold pressure which is communicable with a vacuum chamber 83 of diaphragm assembly 84. Movement of arm 82 as to increase the resistance of caterpillar 79 is an indication of increased throttle or decreased intake manifold vacuum.

As applied to the clutch in Figs. 10 and 11, the circuit of Fig. 2 controls the excitation of clutch coil 65 to control the coefficient of coupling between clutch input and output members 63 and 64. For a constant value of coil excitation, rotary motion of the input member causes a value of rotary deflection of output member 64 against the tension of spring 67. It is clear that a predetermined rotary speed of input member 63 is required before the deflection of output member 64 is sufficient to actuate one of switches 69 by virtue of rotation of cam 71 along with output member 64 to which it is mechanically coupled. Therefore, it is clear that a variation in the value of resistance of caterpillar 79 produces a variation in current flowing in the circuit of coil 65 to vary the coupling between input and output members 63 and 64, accordingly. The varied coupling in turn varies the value of speed of input member 63 required to deflect output member 64 sufficiently to actuate one of switches 69. This arrangement provides for shift advance as the situation may require and optimum gearing between the engine and the load is obtained.

Although the shift advance governor systems as hereinbefore described are particularly adaptable to automotive vehicles, they are amendable to adaptation to many other uses wherein the resultant achievements and capabilities thereof are desirable, and accordingly the invention in its basic respect is to be limited only to the extent of the appended claims.

What I claim is:

1. A shift advance system comprising an internal combustion engine having a variable speed control, said engine being coupled to a load through a transmission having a plurality of selectable gear ratios a shift mechanism for selectively providing one of said gear ratios a solenoid coil for actuating the transmission shift mechanism, a governor coupled to said engine and to said load and being responsive to variations in said speed control and to the speed of the load to produce a control signal for changing gear ratios in said transmission and means coupling said governor to said transmission and applying said signal to said solenoid coil.

2. A shift advance system comprising an internal combustion engine having a variable speed control, said engine being coupled to a load through a transmission having a plurality of selectable gear ratios, a transmission shift mechanism for selectively providing one of said gear ratios a pair of electromagnetic coils for actuating said shift mechanism thereon, a governor being coupled to said load and to said engine and including a pair of switches actuable by said governor in response to variation in the setting of the variable speed control and to the load speed, respectively, said switches being serially connected and being in series with a direct voltage supply and said coil whereby said coil is energized in response to a predetermined load speed control setting and load speed to produce a shift in gear ratio in said transmission.

3. A shift advance system comprising an internal combustion engine having a throttle control linkage, a load coupled to said engine through a shiftable transmission having a plurality of gear ratios a shifting mechanism and a solenoid coil for actuating the shifting mechanism, a governor having rotatable flyweights and a plunger member movable axially in response to radial movement of said flyweights and engaging a switch actuating plate, a pair of switches having contacts actuable by said plate in response to said load speed and having a pair of contacts in series with said solenoid coil, said plunger bearing against one end of a spring to bias said plunger and plate to normally hold said switches open, and a cam connected to said linkage and actuable by said linkage to vary the position of the other end of said spring whereby switch actuation is responsive to a combination of load speed and throttle position to provide an optimum gear ratio in said transmission.

4. A shift advance system comprising a power means coupled to a load through a shiftable transmission, said transmission having a plurality of selectable gear ratios, a shift mechanism adapted when actuated to select one of said gear ratios a solenoid for actuating said shift mechanism to change the gear ratio of said transmission, a governor having a switch mounted thereon, said switch being serially connected with a direct voltage supply and said solenoid, a plurality of flyweights rotatable in proportional relationship to said load speed and being connected to a plunger to impart axial movement thereto, said plunger bearing against a switch plate to limit the movement thereof in one direction, said switch plate being urged against said plunger by a second plunger biased by a spring means, said switch being actuable by said switch plate, means coupled to said engine controlling the magnitude of said spring bias and being responsive to a speed control characteristic thereof whereby an optimum gearing is provided between said engine and said load under all load conditions.

5. A shift advance system comprising a power means coupled to a load through a shiftable transmission having a shift solenoid adapted to select one of the speeds of said transmission, a governor including an eddy current device having a pair of relatively rotatable members, means engendering eddy currents in one of said members in response to relative rotation of said members, one of said members being driven proportionally to the speed of said load, the other of said members being angularly oscillatable in response to the combined influence of a speed control characteristic of said power means and the speed of said first member for controlling the shift points of said transmission.

6. A shift advance apparatus including an engine coupled to the input of a shiftable transmission having at least a pair of gear ratios, a load coupled to the output of said transmission, a governor including a pair of switches and an eddy current device having a rotary input member and an oscillatory output member in closely spaced relationship to each other, a cam member oscillatable with said output member and being adaptable to actuate said switches, said input member being coupled to said transmission output in driving relationship therewith and being responsive to the speed thereof and switch positioning means coupled to said engine and being responsive to a speed control characteristic thereof to provide a shift advance control whereby optimum gearing between said engine and said load is maintained.

7. A shift advance system comprising an internal combustion engine having an intake manifold, said engine being geared to a load through a shiftable transmission actuable by a shift solenoid, a vacuum chamber in communication with said manifold having a diaphragm in one wall responsive to the magnitude of vacuum therein, switch means in series with a source of direct voltage, said solenoid and a second switch means and being actuable by a coupling to said diaphragm, means actuating said second switch means in response to a predetermined speed of said load whereby a control for the shift points of said transmission is provided to maintain an optimum gearing between said engine and a varying load.

8. A shift advance system comprising an engine having a throttle linkage and being coupled to a load through a shiftable transmission having a shift solenoid energizable through a switch means, an electromagnetic eddy current device having an input member and an output member relatively rotatable and traversed by a magnetic field a coil for producing said magnetic field, means including a switch actuable by said output member for energizing said shift solenoid, a caterpillar type variable resistance device, said coil, said variable resistance and a direct voltage source being in a closed circuit, a linkage connected to and actuable by said throttle linkage for varying the resistance of said variable resistance device whereby energization of said coil is decreased in response to increased throttle to decrease the coupling between said members and to delay actuation of said switch means and energization of said second coil is increased in response to decreased throttle to increase the coupling between said members to promote the actuation of said switch means.

9. A shift advance system comprising a load driven by an engine through a shiftable transmission, a governor for controlling the shift points of said transmission comprising an eddy current device having a rotatable input member including a permanent magnet and an oscillatable output member in closely spaced relation to said input member, said output member being oscillatable in the flux produced by said input member, switch means actuated by said output member, an electrical circuit including said switch means in series with a source of direct voltage and a shift solenoid of said transmission, and shift advance control means linked to said engine and coupled to support means for said switch means to displace said switch means in response to the differential between desired and actual engine speed whereby optimum gearing is provided between said engine and said load.

10. A shift advance system comprising a load driven by an engine through a shiftable transmission having a solenoid shift coil, a governor control mechanism having a rotary input member and an output member oscillatable in response to the movement of said input member, switch means and switch actuating means operable by movement of said output member, means controlling the position of said switch means in response to an engine propelling effort characteristic to effect a change in point of actuation of said switch means, whereby the energization of said solenoid shift means is controlled by the load speed and a predetermined engine characteristic to provide optimum gearing between the engine and the load.

11. A shift advance system, having a load driven by an engine through a shiftable transmission having a shift solenoid, comprising a governor having input means and an output means, said input means being responsive to the speed of said load and producing a deflection in said output means, means energizing said solenoid in response to a predetermined deflection of said output means and means responsive to a propelling effort characteristic of said engine to control the magnitude of said predetermined deflection whereby the shift points of said transmission are controlled to maintain optimum gearing from said engine to said load.

12. An eddy current device comprising a rotatable and an oscillatable member arranged in proximate relation to each other, a cam member having a plurality of cam lobes and being secured for integral rotary movement with one of said members, switch means mounted on said device and having actuating means actuable by said lobes, electromagnetic means associated with said members to provide a magnetic flux traversing said members and causing eddy currents to be induced therein in response to relative movement thereof.

13. An eddy current device comprising a rotatable input member and a relatively oscillatable output member in proximate relation to said input member, spring means restraining movement of said ouput member and limit means controlling the extent of movement of said output member, a cam member having a plurality of cam lobes thereon and being oscillatable with said output member, switch means having at least a pair of closable contact sets being adjustably mounted on said device and having actuating means in bearing relationship with said lobes to actuate sets of said switch means in sequence in response to oscillation of said output member, an electromagnetic coil providing a magnetic flux traversing said members to create eddy currents therein in response to relative movement thereof whereby the position of said output member and the actuation of said switches is determined by the speed of said input member and the excitation of said coil.

References Cited in the file of this patent

UNITED STATES PATENTS

| | | |
|---|---|---|
| 2,120,104 | Livermore | June 7, 1938 |
| 2,133,548 | Lassiter | Oct. 18, 1938 |
| 2,260,406 | Roche | Oct. 28, 1941 |
| 2,330,581 | Hefel | Sept. 28, 1943 |
| 2,599,387 | Hefel | June 3, 1952 |